March 26, 1968     R. A. FLIEDER     3,375,403
ELECTRICAL SYSTEM FOR DISCHARGE DEVICE
Filed Oct. 4, 1965
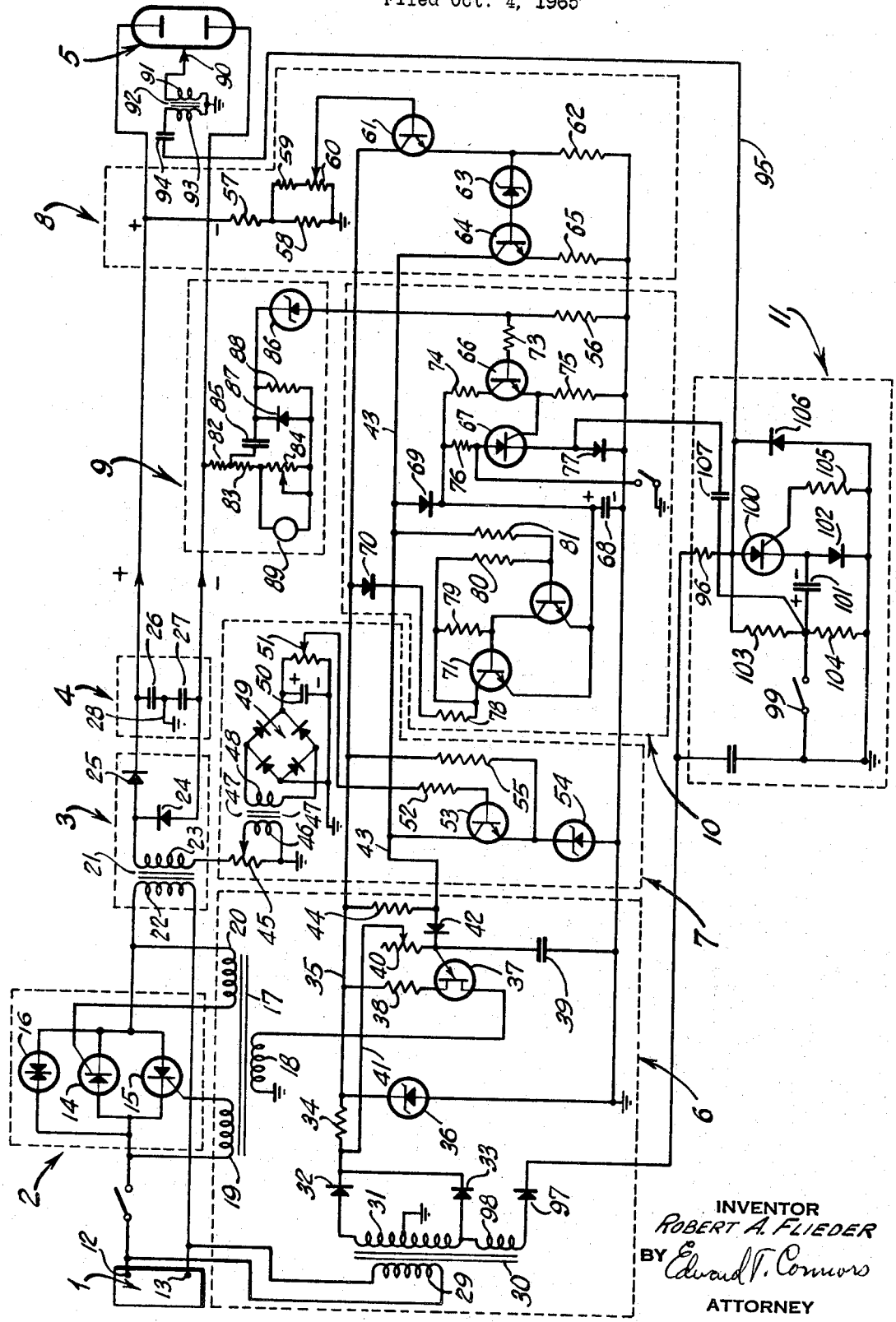
INVENTOR
ROBERT A. FLIEDER
BY Edward T. Connors
ATTORNEY

# United States Patent Office 3,375,403
Patented Mar. 26, 1968

3,375,403
ELECTRICAL SYSTEM FOR DISCHARGE DEVICE
Robert A. Flieder, Fords, N.J., assignor to
Berkey Photo, Inc., New York, N.Y.
Filed Oct. 4, 1965, Ser. No. 492,628
10 Claims. (Cl. 315—240)

ABSTRACT OF THE DISCLOSURE

An electrical system including a gas discharge tube and a capacitor supplying the tube. Circuitry is included for charging the main capacitor at a linear rate. A control bus is provided mantained at a predetermined potential, means monitoring the charging current and voltage of the capacitor, control voltage dropping means for the main bus as does a holdover circuit preventing charging of the capacitor above a predetermined rate until time has passed for the deionization of the discharge tube.

---

This invention relates to an electric system particularly suitable for the supply of a load such as electronic flash lamps used in the photographic and graphic arts.

An electronic flash lamp or discharge tube produces a brilliant flash for a fraction of a second by the discharge of electric current through the tube. The electric energy for the flash is stored in a capacitor generally charged from rectified alternating current. The amount of light produced by a tube depends to a great extent upon the amount of energy in the discharge and thus is proportionate to the charge on the capacitor.

The discharge in the flash tube takes place between two electrodes through a suitable gas. The charged capacitor is connected directly to the tube electrodes. However, the potential of the capacitor is insufficient to initiate a discharge through the tube. A control trigger electrode is produced which may be in the form of a wire wrapped around the flash tube. The trigger electrode is supplied by a surge or pulse which ionizes the gas in the flash tube providing a conducting path for the discharge of the storage capacitor.

In some applications, as in studio photography, it is important that the equipment recycle in a short period of time so that flashes may be produced as rapidly as one every three seconds or less. Further, it is important that the amount of light per flash be the same each time in order that film exposed by the flash may be processed economically by automatic production methods even though the voltage of the power supply applied to the electric system may vary somewhat.

Although it is desirable that the capacitor be quickly recharged so that it is ready for the next flash, the load on the power supply must not be excessive or specially provided high capacity supply lines will be required. The usual power supply for a capacitor is such that the charging rate drops off as the capacitors become charged. Greater economy of operation is achieved if the capacitors are charged linearly at a reasonably fast rate.

The equipment must provide means so that upon the discharge of the flash tube, the current therethrough is reduced below the minimum value which would maintain ionization of the gas so that the tube does not holdover and discharge the capacitor as it is being charged for the next flash. The average time for deionization of a flash tube is about two to three cycles.

The present invention aims to overcome the foregoing difficulties and disadvantages by providing an electric system in which the capacitors are linearly charged to a predetermined value, maintained substantially at this value between flashes, and in which the recharge current is maintained below the holdover value while the flash tube is deionized between flashes.

In accordance with the invention this is achieved by providing an electrical system for a discharge device which includes an electronic switch actuated by a control circuit so that current is supplied to a storage capacitor at a constant rate until a predetermined charge is stored, the control circuit thereafter actuating the electronic switch so that current is supplied at a reduced rate to compensate for any leakage discharge from the capacitor. A triggering circuit is included to discharge the capacitor into the load and to coact with the control circuit so that the electronic switch supplies current at a reduced rate for a predetermined time after the discharge before supplying current at the constant rate to recharge the capacitor.

Another object of the invention is to provide an electric system which is simple and economical in manufacture, efficient in operation, and rugged in use.

Other objects and advantages of the invention will be apparent from the following description and from the accompanying drawing which shows, by way of example, an embodiment of the invention.

The drawing shows a wiring diagram of an electric system in accordance with the invention. The drawing is blocked by dashed lines so as to divide the diagram into component parts of the electric system.

Referring to the drawing there is shown a diagram of an electrical system in accordance with the invention. The electrical system is adapted to be supplied from an alternating current power source 1 which is electronically switched by a phase controlled electronic switch 2 through a rectifier 3 to charge a capacitor bank 4. The capacitor bank 4 is connected to a load which may be an electric discharge device such as a flash tube 5. The electronic switch 2 may be a controlled rectifier triggered by a phase control circuit 6 which in turn receives information from a plurality of sources. Information concerning the charging rate is received from a constant current control 7 and from a voltage sensing control 8. A discharge sensing control 9 actuates a holdover control 10. The discharge device 5 is flashed by a triggering pulse circuit 11 which also activates the holdover control 10. Information from the holdover control 10 is supplied to the phase control circuit 6. The alternating current power source 1, which may be a 117 volt alternating current power supply, is connected to a pair of terminals 12 and 13.

The phase controlled electronic switch 2 includes a pair of controlled rectifiers 14 and 15 connected in inverse parallel. A transient protector 16 is connected in parallel with the controlled rectifiers 14 and 15. A pulse transformer 17 provides means for coupling the phase control circuit 6 to the controlled rectifiers 2 and includes a primary 18 and a pair of secondaries 19 and 20, the secondaries being respectively connected to the gate electrodes of the controlled rectifiers 14 and 15.

A power transformer 21 has its primary 22 connected across the alternating current power supply in series with the electronic switch 2. Secondary 23 of the power transformer 21 has one terminal connected to ground through the constant current control 7, the other terminal of the power transformer being connected to a pair of rectifiers 24 and 25 connected in a voltage doubling circuit to supply a pair of capacitors 26 and 27 with a grounded connection 28, the capacitors 26 and 27 forming the main capacitor bank 4.

A control circuit for the pulse transformer 17 includes a source of controlled direct current potential which may be supplied from the alternating current source 1 through primary 29 of a transformer 30 having a grounded midpoint secondary 31 supplying full wave rectifiers 32 and 33. A dropping resistor 34 connects the rectifiers 32 and 33 to a bus 35 maintained at a constant clamped direct current potential, conveniently at 20 volts, by a zener diode 36. A unijunction transistor 37 is connected through a temperature compensating resistor 38 and through the secondary 18 of the pulse transformer 17 from the bus 35 to ground.

In order to trigger the unijunction transistor 37 a phase controlled circuit is provided including a capacitor 39 connected between the emitter of the unijunction transistor 37 and ground. An adjustable resistor 40 is connected from the unijunction emitter to the output of the rectifiers 32 and 33 by a full wave rectifier bus 41 providing unclamped sinusoidal voltage. The emitter of the unijunction transistor 37 is biased through an isolating diode 42 connected to a control bus 43. A voltage dropping resistor 44 is connected from the clamped constant potential bus 35 to the control bus 43 thus providing a high impedance voltage supply to the control bus 43.

The constant current control 7 is used to provide a constant current charging current for the capacitor bank 4. It will be noted that the constant current charging of capacitors is much more efficient than the usual exponential current charging because of lower losses. The constant current control 7 is supplied by a potentiometer 45 connected in series between one end of the power transformer secondary 23 and ground. The potentiometer 45 is connected to the primary 46 of a transformer 47 having its secondary 48 supplying a rectifier bank 49 which may be bridge connected or otherwise connected as desired. The output of the rectifier bank 49 is connected across a filter condenser 50 and across another potentiometer 51. The output of the potentiometer 51 is applied through an isolating resistor 52 to a voltage reference circuit including an amplifying transistor 53 and a zener diode 54. The amplifying transistor 53 has its collector connected to the control bus 43 and its emitter connected through the zener diode 54 to ground, its base being supplied through the isolating resistor 52. A control potential is applied to the emitter of the transistor 53 through a dropping resistor 55 from the constant potential bus 35. The output of the constant current control 7 is the collector connection to the control bus 43.

The voltage sensing control circuit 8 is supplied from the positive side of capacitor 26 of the capacitor bank 4 through a voltage divider string including a pair of series connected resistors 57 and 58 connected to ground. The connection between the resistors 57 and 58 is connected to a series connected resistor 59 and a potentiometer 60. The potentiometer 60 thereby provides a voltage proportionate to the main voltage on the capacitor bank 4. This voltage is amplified in an emitter follower amplifier transistor 61 having its collector connected to the constant potential bus 35 with its emitter grounded through an emitter load resistor 62. The emitter is also connected through a zener diode 63 to the base of an amplifying transistor 64 which has its collector connected to the control bus 43 and its emitter connected through a resistor 65 to ground. The output of the voltage sensing control is the collector of transistor 64 connected to the control bus 43.

The discharge sensing control 9 and the triggering pulse circuit 11 independently actuate the holdover control 10 to supply information for the phase control 6.

The holdover control 10 acts to limit the charging current to the capacitor bank 4 to a low level immediately after actuation of the discharge device 5 and coacts with the constant current control 7 so that the charging current is drawn at a gradual rate. Immediately after the flash it is desirable that the capacitor bank 4 be charged at a low level so that the discharge device or flash tube 5 will have time to become deionized. However, a more stable circuit results if a slow rate of charge is maintained than if the charging current were to be completely cut off. The holdover control 10 gradually brings up the current to the point where the constant current control 7 is activated.

The holdover control 10 includes an amplifying transistor 66 triggering a controlled rectifier 67 through which is discharged a time delay circuit capacitor 68 connected through a diode 77 to ground. The capacitor 68 is connected to the control bus 43 through an isolating diode 69 and is recharged to the potential of the constant potential bus 35 through a charging circuit including an isolating diode 70 and transistors 71 and 72.

The base of transistor 66 is controlled by the output of the discharge sensing control 9 (described later) received through an isolating resistor 73. A biasing resistor 56 is connected between the zener side of the resistor 73 and ground. The collector of the transistor 66 is connected through a resistor 74 to the positive terminal of the capacitor 68. The emitter of the transistor 66 is connected to the gate of a controlled rectifier 67 and through a resistor 75 to ground. The anode of the controlled rectifier 67 is connected through a discharge resistor 76 to the positive terminal of the condenser 68. The cathode of the controlled rectifier 67 is connected through the diode 77 to ground. The anode of the isolating diode 69 is connected to the control bus 43 and provides the output from the holdover control 10.

In order to recharge the capacitor 68, the charging circuit including transistors 71 and 72 is supplied from the constant potential bus 35 with current through the isolating diode 70 and a current limiting resistor 78 to the collector of the transistor 71, the emitter of the transistor 71 being connected to the emitter of the transistor 72 and to the positive side of the capacitor 68. The transistor 72 has its collector connected to the base of the transistor 71 and through a resistor 79 to the collector of transistor 71. The base of the transistor 72 is connected through a biasing resistor 80 to the collector of transistor 71 and through a current limiting resistor 81 to the control bus 43. The transistor 72 switches the transistor 71 to charge the capacitor 68.

The discharge sensing control circuit 9 is supplied from the negative of the capacitor 27 of the capacitor bank 4 through a voltage dividing string including resistors 82 and 83 connected in series with a potentiometer 84 to ground. A discharge sensing circuit capacitor 85 is connected between the connection of the resistors 82 and 83 through a zener diode 86 to the holdover control 10. At the connection between the capacitor 85 and the zener diode 86 an isolating diode 87 is connected to ground in parallel with a resistor 88. A monitoring voltmeter is provided by a milliammeter 89 connected in shunt with the potentiometer 84 to indicate a voltage proportionate to the capacitor bank 4 voltage. The output of the discharge sensing control is the anode of the zener diode 86.

The triggering pulse circuit 11 is used to apply a triggering pulse to the discharge lamp 5 and simultaneously to apply a pulse to the holdover control 10. The discharge lamp 5 is triggered by a pulse applied to its triggering electrode 90 through secondary 91 of a triggering pulse transformer 92 having its primary 93 connected through a flash triggering circuit capacitor 94 to a flash triggering bus 95 of about 400 volts direct current. A supply for the flash triggering bus 95 is provided through a resistor 96 connected through a rectifier 97 to a second secondary winding 98 of the transformer 30. The triggering pulse circuit 11 is actuated by closing a switch 99.

In order that the switch 99 may be of light construction and may have low voltage thereacross, as for instance, if the switch 99 is installed in a camera, isolation circuitry is provided to discharge the flash triggering capacitor 94. The anode of a controlled rectifier 100 is connected to the flash triggering bus 95 and its cathode is connected to the negative side of a capacitor 101 and also through a diode 102 to ground. The positive of the capacitor 101 is connected to the connection between resistors 103 and 104 and to one side of the switch 99. The other end of the resistor 104 is connected to ground. One end of resistor 103 is connected to the anode of the controlled rectifier 100. The gate electrode of the controlled rectifier 100 is connected through a resistor 105 to ground. An inverse clipper diode 106 is connected from the bus 95 to ground to prevent oscillations through the controlled rectifier 100. The output of the triggering circuit 11 to the holdover circuit 10 is through a coupling capacitor 107 which is connected from the positive side of the capacitor 101 to the cathode of the controlled rectifier 67 of the holdover circuit 10.

The operation of the circuit may perhaps best be understood by considering the condition starting with the flashing of the lamp 5.

Two pulses are directed to the holdover control 10, a main pulse from the triggering pulse circuit 11 and a back-up or secondary pulse from the discharge sensing circuit 9, either of which are capable of activating the holdover control 10. The main holdover pulse is intended to actuate the holdover control, the secondary pulse being provided as a back-up in the event the triggering pulse circuit were not to operate or in the event the lamp were flashed from some external means or because of defects therein.

Upon the flashing of the lamp 5 by the closing of the switch 99 the potential of the connection between the resistors 103 and 104 is dropped to ground. This results in a negative potential being applied at the cathode of the controlled rectifier 100 which fires because its gate is held at ground potential through the resistor 105. Upon the firing of the controlled rectifier 100 the voltage of bus 95 is dropped to ground discharging the triggering capacitor 94 through the triggering pulse transformer 92 so as to flash the tube 5. Simultaneously, the dropping of the potential at the connection between the resistors 103 and 104 draws a negative pulse through the capacitor 107 and thereby applies a negative potential to the cathode of the controlled rectifier 67 which is so biased that it is fired. This has the effect of discharging the capacitor 68 through the discharge resistor 76, the controlled rectifier 67 and the diode 77 to ground. The potential of the control bus 43 is dropped by current flow through the diode 69 upon the discharge of the capacitor 68.

If for any reason the flash tube 5 is flashed without actuation of the triggering pulse circuit 11, a holdover pulse is obtained through the discharge sensing control circuit 9. This is provided by a dropping of the negative capacitor high voltage potential which has the effect of discharging the capacitor 85 through the zener diode 86 which produces a pulse into the base of transistor 66 to drive it into conduction thereby producing a positive pulse on the gate of the controlled rectifier 67 which fires and discharges time delay capacitor 68 as described heretofore. Thus, by a pulse from either the discharge sensing circuit 9 or from the triggering pulse circuit 11, the potential of the control bus 43 is lowered so as to set the charging rate of the main capacitor bank 4 at a very small value.

The charging of the main capacitor bank 4 is accomplished by phase controlled triggering of the controlled rectifiers by the unijunction transistor 37. In turn the unijunction transistor is triggered by the voltage of the capacitor 39 which is charged through the adjustable resistance 40 from the unclamped sinusoidal waveform voltage from the full wave bus 41. In adjusting the circuit during manufacture the anode of the diode 42 is temporarily grounded which has the effect of removing the voltage of the control bus 43 from the capacitor 39.

A setting of the adjustable resistance 40 is then made so that the capacitor bank 4 is charged at the lowest desired charging rate. The temporary ground is then removed from the diode 42. The resistor 44 and the various control circuits connected to the control bus 43 act as a voltage divider which produces a current which is fed through the isolating diode 42 to shorten the charging time of the capacitor 39 and thus advance the phase angle of the triggering pulses from the unijunction transistor 37. Another way of viewing the various control circuits connected to the control bus 43 is by considering them as voltage dropping loads connected to a high impedance clamped voltage supply which is the control bus 43 supplied through the resistor 44. The capacitor 39 is charged from the unclamped sinusoidal voltage from the full wave bus 41 to which is added the voltage of the control bus 43 supplied through the diode 42 so that the capacitor 39 is charged at a practically linear rate which produces a high degree of control sensitivity for the triggering of the controlled rectifiers 14 and 15 through the unijunction transistor 37. Small voltage changes on the control bus 43 produce large changes in the phase angle of triggering of the unijunction transistor 37. Upon the triggering of the unijunction transistor 37 pulses of appropriate phase position with respect to the alternating current supply are induced in the secondaries 19 and 20 which trigger the controlled rectifiers 14 and 15. Immediately after the discharge of the flash tube 5, the triggering will be late in the cycle thereby providing a limited current flow to the transformer 21 which starts the charge on the capacitor bank 4. Meanwhile the voltage of the control bus 43 increases slowly with the voltage of the time delay capacitor 68 which is being charged through resistor 44 and diode 69 from the constant potential bus 35. As the voltage control bus 43 is slowly allowed to increase the capacitor 39 charging time shortens so as to advance the phase of firing of the control rectifiers 14 and 15.

As the current to the capacitor bank 4 increases the current control 7 assumes control of the charging rate. If the charging rate is higher than desired the effect of the current control 7 is to drop the voltage of the control bus 43. This might cause too long a delay in the charging of the large capacity time delay capacitor 68 unless other charging means were provided. The capacitor 68 is then charged from the constant potential bus 35 through the diode 70, the current limiting resistor 78 and the transistors 71 and 72 at a high rate to the potential of the constant potential bus 35 and is thus ready for another operation of the holdover control 10. This charging of the capacitor 68 is accomplished by the base of the transistor 71 becoming forward biased through the resistor 79 as the transistor 72 is cut off due to its reduced bias from the control bus 43 through the resistor 81. The potential of capacitor 68 is thus brought to that of the constant potential bus 35 and is prevented from reaching the control bus 43 by the diode 69 while the control bus 43 voltage is held down by the constant current control 7.

The operation of the current control 7 depends upon the sensing of the current through the secondary 23 of the power transformer 21 as a voltage developed across the potentiometer 45. This voltage is amplified in the transformer 47 and rectified by the rectifier 49 and filtered with the capacitor 50 so as to be developed as a direct current voltage across the potentiometer 51. This voltage is proportionate to the RMS charging current of the capacitor bank 4 and is fed through the current limiting resistor 52 to the base of the reference amplifying transistor 53. This voltage is compared to the voltage across zener diode 54 as a reference. An increase in the RMS charging current of the capacitor bank 4 is reflected as an increase in the proportionate voltage compared with the voltage of the zener 54 in the transistor 53. Such an increase of voltage will cause conduction of the transistor 53 thus lowering the voltage of the control bus 43. This, in turn, reduces the phase angle of triggering of the controlled rectifiers 14 and 15 and so reduces the RMS charging current to the capacitor bank 4. The current control 7 thus causes constant current charging of the capacitor bank 4.

Upon the charging of the capacitor bank 4 to its full voltage, the voltage sensing control 8 takes over. This control is connected to the positive high voltage side of the capacitor 26. A voltage proportionate to the positive high voltage is developed at the base of transistor 61. This is amplified and produces a voltage across load resistor 62. When this voltage becomes greater than the zener voltage of zener diode 63 current is conducted through the zener diode 63 into the base of transistor 64 to bias it into conduction so as to drop the voltage of control bus 43. This control operates continuously to maintain a practically constant high voltage to compensate for any leakage.

From the preceding description it will be seen that the present invention provides an electric system for the charging of a capacitor bank for discharge lamps at a linear rate. The electric system incorporates means for reducing the charging rate so that the discharge lamp becomes deionized and for maintaining the charge on the capacitor bank at a desired level.

While the invention has been described and illustrated with reference to a specific embodiment in which the load is a discharge lamp, it is understood that other embodiments may be resorted to without departing from the invention. Therefore, the form of the invention set out above should be considered as illustrative and not as limiting the scope of the following claims.

I claim:

1. An electrical system comprising a main capacitor, a flash tube, a source of electricity, means charging the main capacitor from the source of electricity at a linear rate including a charging control capacitor, means establishing a minimum potential on said charging control capacitor, a control bus connected to said charging control capacitor, a voltage supply, a resistance connected between said voltage supply and said control bus, means monitoring the charging current of the main capacitor and establishing a voltage proportionate thereto, first voltage dropping means connected to said control bus and controlled by said proportionate voltage, means for maintaining the charge on the main capacitor at a predetermined value including main capacitor voltage sensing means establishing a second voltage proportionate thereto, second voltage dropping means connected to said control bus and controlled by said second proportionate voltage, a holdover circuit network including a holdover circuit capacitor connected to said control bus, means to discharge the main capacitor into the flash tube and simultaneously to discharge said holdover circuit capacitor so as to depress the voltage of the control bus for a predetermined time interval until the flash tube becomes deionized so that for the predetermined time interval the charging of the main capacitor takes place at a rate insufficient to maintain ionization of the flash tube, means to charge said holdover circuit capacitor from said voltage supply, and means to block the potential of the holdover circuit capacitor from the control bus.

2. An electrical system according to claim 1 in which said means establishing a minimum potential on said charging control capacitor is a rectified full wave power supply.

3. An electrical system according to claim 1 in which said high impedance voltage supply includes a zener diode so that the voltage is controlled.

4. An electrical system according to claim 1 in which said means monitoring the charging current of the main capacitor and establishing a voltage proportionate thereto includes a transformer, a rectifier bridge connected to the transformer secondary, a capacitor connected across the output of the rectifier bridge, and a voltage divider connected across the capacitor.

5. An electrical system according to claim 1 in which said first voltage dropping means connected to said control bus and controlled by said proportionate voltage includes a zener diode and a transistor, the transistor collector and emitter connected in series with the zener diode between the control bus and ground so that the zener diode provides a voltage reference for said proportionate voltage whereby constant current control is achieved.

6. An electrical system according to claim 1 in which said second voltage dropping means connected to said control bus and controlled by said second proportionate voltage includes a transistor having its collector-emitter circuit connected between the control bus and ground, and a zener diode is provided and connected in the base circuit of the transistor so that the zener diode provides a voltage reference for said second proportionate voltage.

7. An electrical system according to claim 1 in which said main capacitor voltage sensing means establishing a second voltage proportionate thereto is a voltage divider.

8. An electrical system according to claim 1 in which said means to discharge the main capacitor into the flash tube and simultaneously to discharge said holdover capacitor includes flash tube trigger means, controlled rectifier means connected across said holdover capacitor, a bus, means to apply a potential to said bus, switching means connected between said bus and ground, coupling capacitors connected respectively between said flash tube triggering means and said controlled rectifier means whereby upon the grounding of the bus by the switching means said coupling capacitors are pulsed respectively actuating said trigger means and said controlled rectifier means.

9. An electrical system according to claim 1 in which said means to charge said holdover circuit capacitor from said voltage supply includes a diode, a transistor having its collector emitter circuit connected in series with said diode, and control means for said transistor responsive to the potential of said control bus.

10. An electrical system according to claim 1 in which said means to block the potential of the holdover circuit capacitor from the control bus is a diode.

References Cited

UNITED STATES PATENTS 3,248,605    4/1966    Tomkinson _____ 315—241
3,262,045    7/1966    Hauck _____ 307—88.5

OTHER REFERENCES

Electronics: "Capacitance Chargers for Space Employ Controlled Rectifiers" by Ellern, Oct. 11, 1963, pp. 32–33.

JOHN W. HUCKERT, *Primary Examiner.*

J. D. CRAIG, *Assistant Examiner.*